United States Patent [19]
Chang et al.

[11] 3,891,547
[45] June 24, 1975

[54] PERMEABLE HOLLOW FIBER FILTER

[75] Inventors: Daniel P. Y. Chang, Davis; Sheldon K. Friedlander, Pasadena, both of Calif.

[73] Assignee: California Institute of Technology, Pasadena, Calif.

[22] Filed: Apr. 8, 1974

[21] Appl. No.: 458,795

Related U.S. Application Data

[63] Continuation-in-part of Ser. No. 296,097, Oct. 10, 1972, abandoned.

[52] U.S. Cl. ............... 210/23; 210/321; 210/502
[51] Int. Cl. ............................................. B01d 13/00
[58] Field of Search ............. 195/63, 68, DIG. 11; 210/22, 23, 24, 70, 223, 321, 502, 416

[56] References Cited
UNITED STATES PATENTS

| | | | |
|---|---|---|---|
| 3,342,729 | 9/1967 | Strand | 210/23 |
| 3,398,092 | 8/1968 | Fields et al. | 210/24 X |
| 3,429,104 | 2/1969 | Hirshfield | 210/24 X |
| 3,778,366 | 12/1973 | Kraus | 210/321 X |

*Primary Examiner*—Frank A. Spear, Jr.
*Assistant Examiner*—Robert G. Mukai
*Attorney, Agent, or Firm*—Lindenberg, Freilich, Wasserman, Rosen & Fernandez

[57] ABSTRACT

A fluid filter is provided wherein the fibers of the filter constitute hollow tubes which are terminated at their respective ends in manifolds. A fluid is pumped through these manifolds which increases the ability of the hollow fibers to intercept and retain the particles which it is desired to remove from the fluid being filtered.

4 Claims, 4 Drawing Figures

PERMEABLE HOLLOW FIBER FILTER

ORIGIN OF THE INVENTION

The invention described herein was made in the course of work under a grant or award from the Department of Health, Education and Welfare.

CROSS-REFERENCE TO RELATED APPLICATIONS

This application is a continuation-in-part of application Ser. No. 296,097 filed Oct. 10, 1972 now abandoned.

BACKGROUND OF THE INVENTION

This invention relates to filters which may be employed for filtration of solid particles from fluid suspensions, and more particularly, to improvements therein.

Filtration by fibrous media can conveniently be described as a two-step process. First, the particles must be brought into the vicinity of the collecting surface. Second, the particle must attach itself to the surface.

The first step is governed primarily by the fluid motion. The most significant mechanisms by which a particle comes close to the surface can be classified as an inertial deposition (including sedimentation), interception and diffusion. Inertial deposition occurs for particles whose density is greater than that of the fluid and whose diameter is greater than about 10 microns. These particles are unable to follow the fluid stream lines around the collector and impact upon it. On the other hand, diffusion is important for particles smaller than about 1 micron. Random thermal motions of the particle are superimposed upon the mean fluid motion and again, the particle deviates from the stream lines. Removal by interception occurs even when the particles are able to follow the fluid stream line and is due to the finite size of the particles. The size range in which it plays a major role is between the inertial and diffusion ranges, i.e., from 1 to 10 microns. Considering the interception range, the particles follow the fluid stream line until they come within 1 particle radius of the collecting surface, where classical theory assumes that they adhere. Such a simple picture neglects the attachment process and the complex interaction of forces which occurs.

A more recently advanced theory suggests that the hydrodynamic resistance encountered by a particle near the collector surface due to the squeezing out of fluid between the particle and collector cannot be neglected, as in the classical theory. Furthermore, intermolecular attractive forces (London-Van der Waals forces) must also be included, as well as electrostatic "double layer" forces (usually repulsive) which arise from the charge carried by the particle and the collector.

In an article entitled "Water Waste Filtration: Concepts and Applications", by Yao et al., Page 1105, Volume 5, No. 11, November 1971 in the magazine "Environmental Science and Technology", there are described experiments for increasing the particle collection efficiency of fibrous filters. Latex particles and glass beads, sized on the order of microns, were to be filtered from a suspension in water. The latex particles and glass beads were found to be negatively charged in the water suspension. To increase the filter capture efficiency a destabilizing chemical such as cationic polymer was coated on the fibers of a filter bed and then the water suspension was passed therethrough. In a second series of experiments, the precoating of the filter beds was used and in addition polymer was fed throughout to the water suspension throughout the duration of the filter runs.

It was found that these techniques did increase filter collection efficiency. However, the precoating of the fibers of a filter requires immersing the fibers in a sufficient and substantial quantity of polymer solution to insure a thorough coating, and the requirement for continuous addition of a polymer to the solution being filtered is wasteful of the polymer solution. Applying uniform coating to the fibers is difficult. The coating on the fibers does wear off and requires periodic renewal. For best operation the coating should be continuously renewed.

The technique that is presently being used is the addition of electrolytes to the bulk solution and not fiber precoating for the purposes of neutralizing the surface charges on the surfaces of the filter fibers. However, this is wasteful of the chemical additive and requires continual supervision to prevent chemical overdosage, which may itself cause a problem.

In U.S. Pat. No. 3,342,729 to N. S. Strand there is described a permeability separatory cell comprising a frame with a central opening, across which are stretched a plurality of hollow fibers, to form a fiber mesh. This arrangement is used as a permeability separatory cell for selective separation of various fluid components by passing solutions through the fiber mesh and other solutions through the hollow fibers which cause the fluid to be separated from the solution to pass through the hollow fiber walls and into the hollow fibers and thus be separated from the remainder of the solution passing through the mesh of hollow fibers.

OJBECTS AND SUMMARY OF THE INVENTION

It is an object of this invention to provide a novel method and means of using a hollow fiber mesh filter for filtering particles from a fluid in which they are dispersed.

Yet another object of this invention is the provision of a novel method and means for increasing the particle collection efficiency from a fluid suspension, using a hollow fiber mesh filter.

Still another object of this invention is the provision of an efficient method and means for using a destabilizing chemical for improving the particle collection efficiency of a mesh filter.

These and other objects of the invention are achieved by constructing a hollow fiber filter wherein the ends of the fibers are connected to manifold arrangements. A fluid is pumped through the hollow fibers for the purpose of reducing substantially the particle repelling forces at the regions adjacent the walls of the hollow fibers which interface with the fluid being filtered. The selection of the fluid which is to be pumped through the holow fibers is determined by the results desired. When water is forced into the fiber interior, the viscous layer between the outer surface of the fiber and approaching particles are removed thereby eliminating the hydrodynamic resistance.

Addition of a concentrated electrolyte to the interior of a fiber, which is slightly permeable to the electrolyte ions, results in the diffusion of ions through the wall to the surface due to the concentration gradient. The fiber surface thus becomes a region of high ionic strength where double layer repulsions are minimized. Addition of a polyelectrolyte solution to the interior of a hollow fiber, which is slightly permeable to the polyelectrolyte, will also result in the diffusion of the polyelectrolyte to the surface where it will adhere and coat the surface. By selecting the proper polymer, the surface charge may be made opposite that of the particle and the double layer repulsion will become an attraction.

An added benefit of the destabilizing chemical addition to the interior of the fiber is that it simultaneously provides a chemical potential gradient tending to drive water molecules into the fibers giving the same results as occur in connection with forcing water into the interior of the fiber.

In all of the foregoing instances there is very little flow of fluid through the fiber walls. No selective separation of any components of a solution occurs. Enough of the destabilizing fluid which is pumped through the hollow fibers passes through the walls to keep the outside surfaces of the fibers coated and any excess is added to the fluid suspension at the region where it will do the most good. Thus, the destabilizing fluid is used most efficiently and economically.

The novel features of the invention are set forth with particularity in the appended claims. The invention will best be understood from the following description when read in conjunction with the accompanying drawings.

DESCRIPTION OF THE PREFERRED EMBODIMENTS

FIG. 1 of the drawings is illustrative of an arrangement of apparatus used in an embodiment of the invention.

The filter comprises a plurality of hollow fibers 10 which may be in the form of a woven cloth mesh or an irregularly disposed pile of fibers, each of which fibers however has its ends potted using an epoxy, for example, to the inside of a manifold, 12A, 12B, 12C or 12D. That is, for example, the fiber 10A has its opposite ends potted in the respective manifolds 12A, 12B. Fiber 10B has its opposite ends potted in the respective manifolds 12C and 12D. These manifolds are fitted together so that they resemble a frame for the hollow fibers.

Hollow fibers of the type suitable for use in a filter of this sort are manufactured by the Dow Chemical Company, located in Midland, Mich. Filters of this type have been built and satisfactorily operated wherein the fibers have an O.D. of 230 microns.

A pump 14 is used to pump the water or chemical fluid into the respective entrance ports, respectively 16, 18. The fluid passes through the fibers, back into the manifolds and then out through the exit ports, respectively 20, 22. The fluid can be either disposed of, or replenished and returned to the pump.

In the event that it is desired to use a reduced pressure operation, that is, to reduce the pressure within the fibers, then the outlet ports may be capped and the pump 14 is an evacuating pump. The depth of the fiber bed and the packing density of the fibers depends upon the particular application. They need not be oriented in any particular direction. The direction of the fluid flow is preferably, as shown by the arrows in the drawing, perpendicular to the axes of the fibers. The shape of the manifold need not be square but may be round so that installation may be made in pipeline.

Illustrative of electrolytes which have been used with filters of this type and which show an increase filter collection efficiency are for example, solutions of calcium chloride or sodium chloride. Low molecular cationic polyelectrolytes with molecular weights — about 10,000, may also be used.

The hollow fibers do not freely pass the solution being pumped therethrough. They are slightly permeable to this solution, as previously indicated permitting diffusion of ions or diffusion of polyelectrolyte through the fiber walls to coat the surface of these walls and add minimal amounts to the particle carrying solution in the interface regions of the filter where it is most needed, and without any possibility of overdosing. Also, no selective separation of components of a solution occurs when the hollow fiber filter is used in the manner described, either from inside the hollow fibers through the walls or from outside the hollow fibers through the walls.

Hollow fibers may also be used in the reverse mode should it be desirable not to collect particles, as in blood filtration.

In addition to the present invention increasing the particle collection efficiency of a filter over conventional fibrous filters, they avoid the current practice of adding polyelectrolytes or high concentrations of electrolytes to the bulk solution, which is done for the purpose of neutralizing the surface charges of the fibrous material used as a filter. The present invention minimizes the amount of chemcial addition to the solution by utilizing the chemicals only in the region where it has maximum effectiveness, near the surface. Thus, this reduces the chemical costs as well as lowers the concentrations of chemicals added to the solution being filtered, which may itself be a problem. Finally, the present invention offers a simple method of chemical addition which does not require operator supervision and which prevents polyelectrolyte overdosing which can occur in current methods.

With conventional woven filters, during the initial stages of filtration, particles penetrate before a bed of deposited material has had a chance to accumulate. This causes binding or plugging of the cloth filter. With the present invention, this is minimized by providing an increase in the initial efficiency of the cloth by the addition of an electrolyte and the simultaneous flow of fluid into the hollow fibers of the cloth.

Tests were run to study the effects of varying ion concentration on the particle collection efficiency of commercially available hollow fibers made from cellulose acetate, with a molecular weight cut off of about 200. Unbuffered sodium chloride solutions of differing concentrations were flowed through a fiber interior while latex particles suspended in deionized distilled water, ($DDH_2O$), flowed past the fiber exterior.

Figure 1:
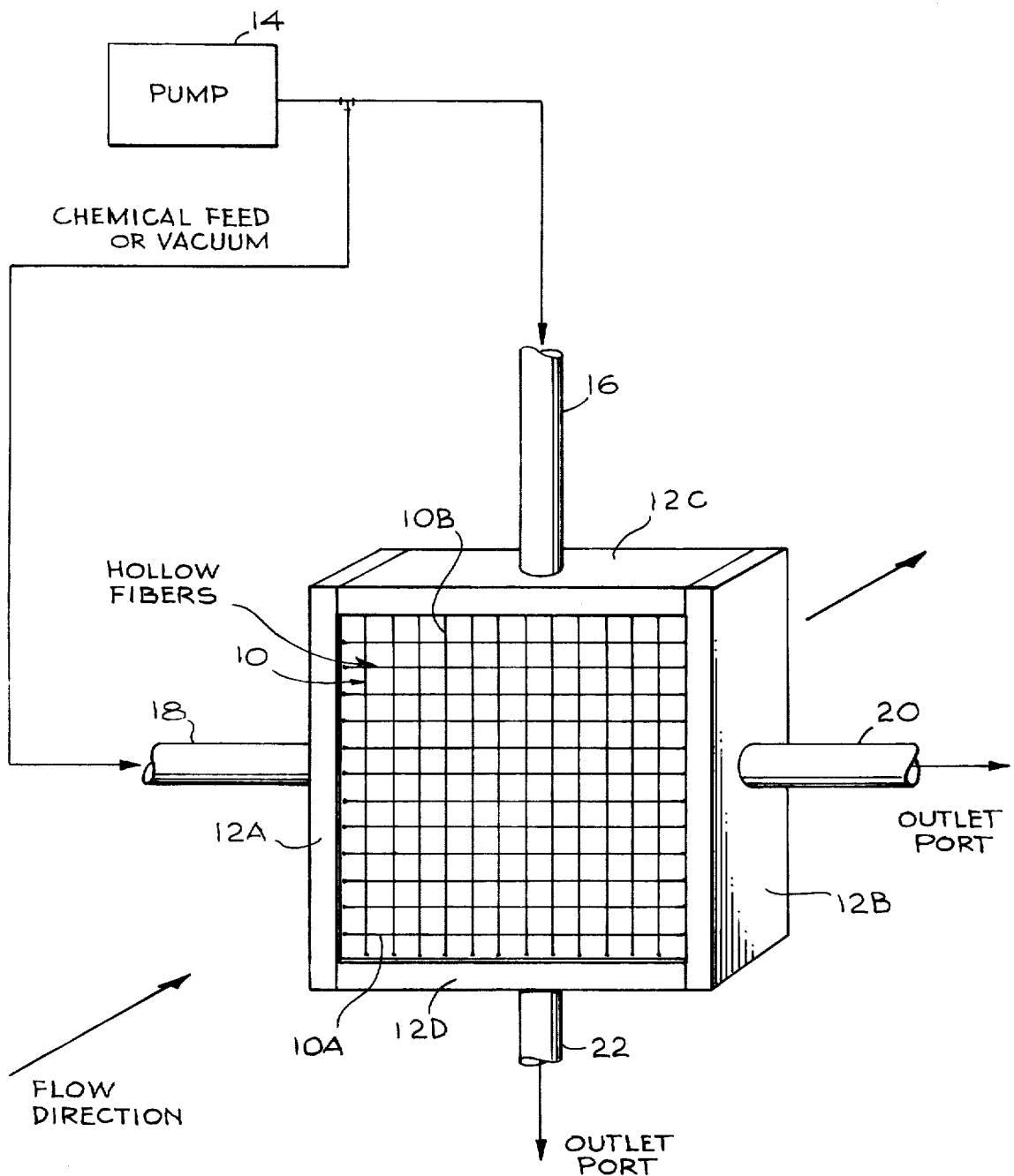
FIG. 1 is a view in perspective of an embodiment of the invention.
Figure 2:
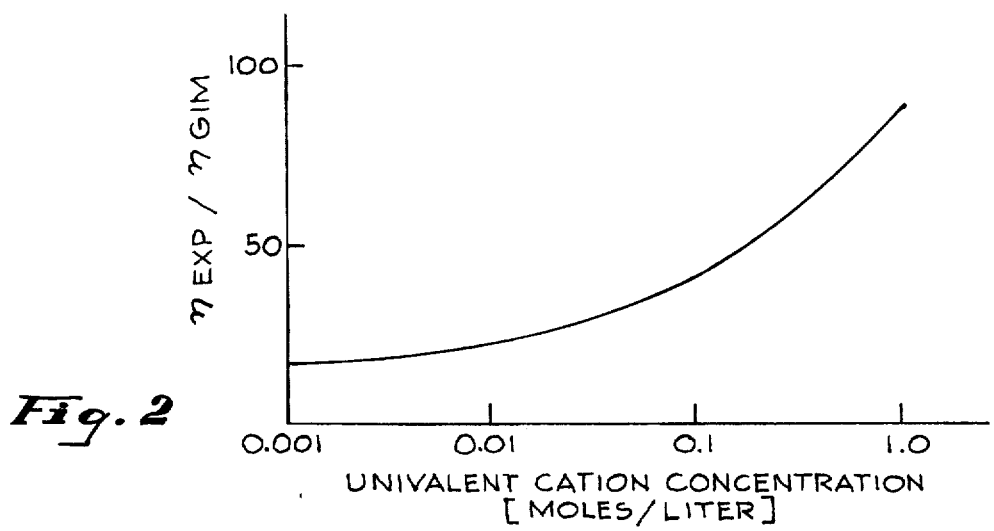
FIG. 2 is a curve representing the increase in solid particle collection efficiency of a hollow fiber with increasing electrolyte concentration.
Figure 3:
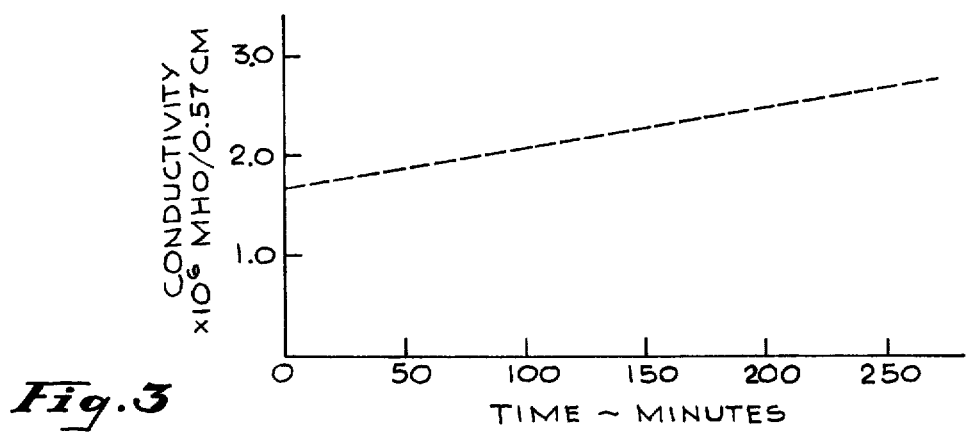
FIG. 3 is a curve representing the increase in conductivity of a particle carrier solution with time, as an electrolyte is passed through a hollow fiber.
Figure 4:
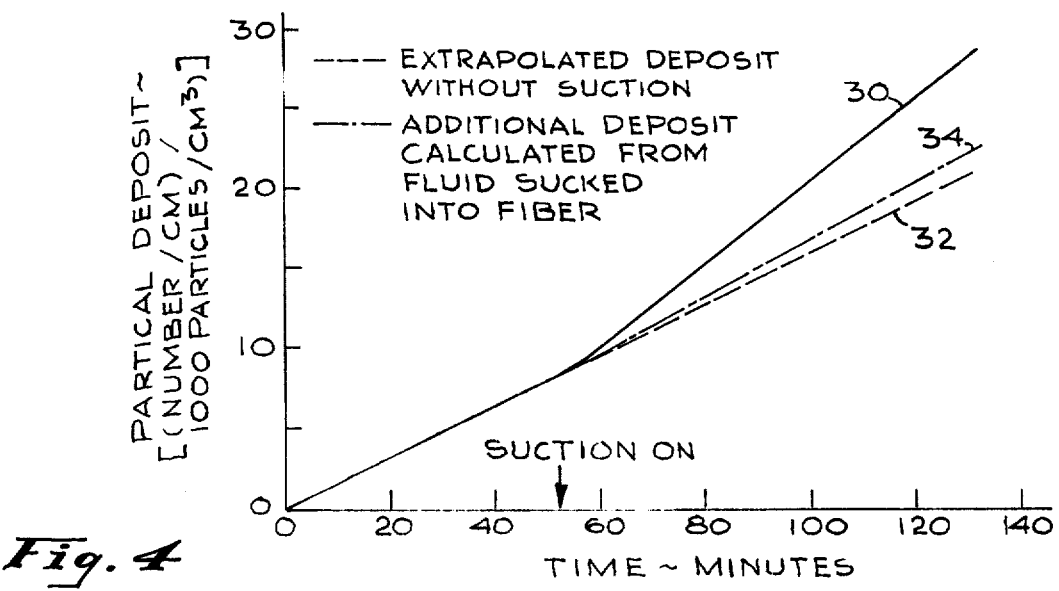
FIG. 4 is a curve showing the difference in solid particle collection with time with and without the application of a vacuum to the hollow fiber.

The curve shown in FIG. 2 clearly illustrates the increased collection efficiency $\eta EXP/\eta GIM$, of the fiber which is achieved with increasing concentrations of NaCl. $\eta EXP$ is the dimensionless fiber collector efficiency calculated from direct observation, (through a microscope), of the rate of deposition of particles at the fiber surface, and the measured flow rate past the exterior of the fiber. $\eta GIM$ is the theoretical deposition rate (dimensionless) of particles at the fiber surface, if the fiber were a "perfect collector", and the fiber were a solid material, i.e., conventional filter material such as glass fiber. The ratio $\eta EXP/\eta GIM$ is a measure therefore of the increased collection efficiency of the fiber for NaCl addition.

In order to measure the amount of sodium chloride which "leaks" through the fiber wall, the conductivity of the particle suspension was measured as a function of time and this can be directly related to the NaCl concentration. One molar of NaCl feed solution, was used, which is a "worst case". The loss rate would be lower for other feed solutions, since they are either less concentrated or less permeable to the fiber membrane.

The increase in the conductivity of the solution from about (1.25/0.57) mho/cm to (2.95/0.57) mho/cm corresponds to an increase in the NaCl concentration of $2.1 \times 10^{-5}$ moles/litre. The entire volume of the test apparatus was about 1.3 litres, hence $2.73 \times 10^{-5}$ moles of NaCl escaped from the fiber interior of the solution in about 260 minutes. During the same period of time, it is conservatively estimated that 50ml of 1 mole/litre NaCl feed solution was passed through the fiber interior, which corresponds to 0.05 moles of NaCl. Therefore the fraction of feed solution lost was about $2.73 \times 10^{-5}/5 \times 10^{-2} = 5.46 \times 10^{-4}$ or 0.05% of the NaCl solution was actually used.

From the foregoing it will be seen that very little of the feed solution passing through the filter fibers is used or required to substantially increase the particle collection efficiency of the hollow fiber filter. There is a substantially minimal flow of feed solution through fiber walls.

FIG. 4 is a curve which quantitatively shows the increased rate of deposition of particles observed, due to suction only. The solid line curve represents the actual particle deposition per cm of fiber length and concentration of particles versus time, when a slight suction is used. The dotted line extension of the solid curve, 32, is an extrapolation of the curve obtained without suction, and thus shows what can be obtained without suction. The dash dot line, 34 shows the calculated additional deposit obtained from fluid sucked into the fiber. Thus, the application of a vacuum definitely increases the hollow fiber particle collection efficiency.

There has accordingly been described and shown a novel, useful and improved filter and method and means for the operation thereof.

What is claimed is:

1. A method of improving the particulate matter collection efficiency of a hollow fiber mesh filter comprising flowing a carrier solution containing particulate matter to be collected between the fibers of said hollow fiber mesh filter, said fibers being substantially nonpermeable to said particulate matter and being constructed and arranged to permit the passage of the carrier fluid therebetween while intercepting the particulate matter, modifying the outer wall surface of said hollow fibers and the region immediately therearound to increase the efficiency of particulate matter collection by passing a fluid through said hollow fibers to which said hollow fiber walls are slightly pervious, where said fluid is one of the group consisting of a solution of an electrolyte, a solution of a polyelectrolyte, and water.

2. In a mesh filter of the type wherein a plurality of hollow fibers are constructed and arranged to permit the passage of fluid therebetween while intercepting particulate matter which is in said solution, said fibers being substantially nonpermeable to said particulate matter the method of improving the efficiency of said filter comprising:

evacuating fluid from the interior of said plurality of hollow fibers to which said hollow fiber walls is slightly pervious to modify the interface region between said hollow fiber walls and said solution to enable more particulate matter to impinge on said plurality of fiber walls.

3. A method of improving the efficiency of the removal of particles from a solution by a mesh filter of the type wherein a plurality of hollow fibers are constructed and arranged to permit the passage of fluid therebetween while intercepting particulate matter which is in said solution comprising applying said solution containing particulate matter to one side of said filter to pass therethrough, said hollow fibers being substantially nonpermeable to said particulate matter, and reducing the viscosity of the solution in the region around the outsides of said hollow fibers while said solution is passing through said filter by passing water through said hollow fibers to which said fiber walls are slightly permeable to thereby reduce the hydrodynamic resistance to the interception of said particulate matter by said hollow fibers.

4. The method of improving the efficiency of the removal of particulate matter from a solution by a mesh filter of the type wherein a plurality of hollow fibers are constructed and arranged to permit the passage of fluid therebetween while intercepting particulate matter which is in said solution, said fibers being substantially nondiffusible by said particulate matter, comprising applying said solution containing particulate matter to one side of said filter to pass between said hollow fibers, and altering the charge on the outer walls of said hollow fibers and in the regions of said solution adjacent thereto while said solution is passing through said filter by passing a fluid through said hollow fibers to which said fiber walls are only slightly permeable, where said fluid is one of the group consisting of a solution of an electrolyte and a solution of a polyelectrolyte, to minimize charge repulsion of particulate matter and to improve the efficiency of particulate matter collection by said fibers.

* * * * *